United States Patent [19]

Azuma

[11] Patent Number: 5,699,775
[45] Date of Patent: Dec. 23, 1997

[54] FAILURE DIAGNOSIS DEVICE OF FUEL EVAPORATION PREVENTIVE APPARATUS

[75] Inventor: Tadahiro Azuma, Tokyo, Japan

[73] Assignee: Mitsubishi Denki Kabushiki Kaisha, Tokyo, Japan

[21] Appl. No.: 708,480

[22] Filed: Aug. 13, 1996

[30] Foreign Application Priority Data

Mar. 4, 1996 [JP] Japan ................... 8-46099

[51] Int. Cl.$^6$ ................................ F02M 33/02
[52] U.S. Cl. ...................................... 123/520
[58] Field of Search .................. 123/519, 520, 123/198 D

[56] References Cited

U.S. PATENT DOCUMENTS

| | | | |
|---|---|---|---|
| 5,295,472 | 3/1994 | Otsuka et al. | 123/520 |
| 5,297,527 | 3/1994 | Suzuki et al. | 123/520 |
| 5,299,545 | 4/1994 | Kuroda et al. | 123/520 |
| 5,305,724 | 4/1994 | Chikamuatsu et al. | 123/520 |
| 5,327,873 | 7/1994 | Ohuchi et al. | 123/520 |
| 5,333,589 | 8/1994 | Otsuka | 123/520 |
| 5,333,590 | 8/1994 | Thomson | 123/520 |
| 5,339,788 | 8/1994 | Blumerstock et al. | 123/520 |
| 5,460,141 | 10/1995 | Denz et al. | 123/520 |
| 5,460,143 | 10/1995 | Narita | 123/520 |
| 5,463,998 | 11/1995 | Denz et al. | 123/520 |
| 5,490,414 | 2/1996 | Durschmidt et al. | 123/520 |

FOREIGN PATENT DOCUMENTS 5-125997   5/1993   Japan .

*Primary Examiner*—Thomas N. Moulis
*Attorney, Agent, or Firm*—Sughrue, Mion, Zinn, Macpeak & Seas, PLLC

[57] ABSTRACT

A failure diagnosis device of a fuel evaporation preventive apparatus including: a fuel evaporation preventive apparatus having a canister having an atmospheric hole communicating with outside air and installed in the middle of a purge passage communicating a fuel tank with an intake pipe, for preventing evaporation of fuel by adsorbing at any time fuel gas generated in the fuel tank by an adsorber incorporated in the canister and pertinently introducing the adsorbed fuel gas into the intake pipe by controlling a purge control valve in accordance with a running state of an internal combustion engine; an initializing apparatus for controlling an inner pressure of the fuel tank to a predetermined initial pressure; a pressure controlling apparatus for changing the initial pressure to a predetermined target pressure and controlling a purge amount at that time to a constant flow rate by closing the atmospheric hole and driving the purge control valve; a hermetically enclosing apparatus for constituting a hermetically enclosed section in the fuel evaporation preventive apparatus by closing both the purge control valve and the atmospheric hole when the inner pressure of the fuel tank reaches the target pressure; a pressure detecting apparatus installed in the hermetically enclosed section; and a failure diagnosing apparatus for diagnosing failure of the fuel evaporation preventive apparatus based on a change of an inner pressure of the hermetically enclosed section.

11 Claims, 6 Drawing Sheets

| INTAKE PIPE NEGATIVE PRESSURE Pn (mmHg) | 119 | 178 | 237 | 297 | 356 | 415 | 475 | 534 | 593 |
|---|---|---|---|---|---|---|---|---|---|
| PRGEVP (%) | 24 | 16 | 14 | 12 | 11 | 10 | 10 | 10 | 9 |

FAILURE DIAGNOSIS DEVICE OF FUEL EVAPORATION PREVENTIVE APPARATUS

BACKGROUND OF THE INVENTION

1. Field of the Invention

The present invention relates to a failure diagnosis device diagnosing failure of a fuel evaporation preventive apparatus preventing fuel from evaporating into the atmosphere by introducing fuel gas generated in a fuel tank into an intake path such as an intake pipe.

2. Discussion of Background

There has been generally known an evaporation purge system for preventing fuel (vapor) evaporated in a fuel tank from emitting into the atmosphere, which adsorbs vapor once to an adsorber incorporated in a canister and makes it combusted by introducing the adsorbed vapor into an intake path while a vehicle is running.

In such a system, when a purge passage for letting vapor flow is destructed for some cause or when pipings are disintegrated, vapor emits into the atmosphere from the destructed portion or the portion where the pipings are disintegrated. Or, when the purge passage communicating the canister with the intake path is blocked, vapor in the canister overflows and the vapor leaks from an atmospheric hole installed to the canister.

Accordingly, it is required in such an evaporation system to diagnose presence or absence of occurrence of failure.

To meet the requirement an abnormality detecting device for a fuel evaporation preventive apparatus as disclosed in Japanese Unexamined Patent Publication No. 125997/1993, or the like has been proposed.

According to the publication, it is on the premise that when a portion of the fuel evaporation preventive apparatus is hermetically enclosed, if there is a leakage portion in the hermetically enclosed section, flowing-out is caused from the hermetically enclosed section to the atmosphere in the case where the hermetically enclosed section is under a positive pressure and also flowing-in is caused from the atmosphere to the hermetically enclosed section in the case where it is under a negative pressure. Further, a pressure change value $\Delta P1$ in the hermetically enclosed section under the atmospheric pressure in a predetermined period of time and a pressure change value $\Delta P2$ in the hermetically enclosed section under negative pressure in the predetermined period of time, are detected and abnormality of the device is detected by comparing $\Delta P1$ with $\Delta P2$.

It is currently required by the EPA (Environmental Protection Agency) in the Unites States of America that even if a hole having a diameter of 1.0 mm is perforated in a fuel evaporation preventive apparatus, the hole can be detected as abnormality. Further, the regulation is expected to become more severe in the future and it is scheduled in the future to require detection of a hole having a 0.5 mm diameter.

According to the device in the above-mentioned publication, there is a difference between states of the pressure change in the hermetically enclosed section when the apparatus is normal and when the apparatus is leaking in the case where the diameter of a hole is 1.0 mm and the failure can be detected.

However, no considerable difference is found between states of the pressure change in the hermetically enclosed section when it is normal and when it is leaking in the case where the diameter of a hole is 0.5 mm since a leakage amount thereof is reduced and the detection of failure is difficult.

SUMMARY OF THE INVENTION

The present invention resolves the above-mentioned problem, and it is an object of the present invention to provide a failure diagnosis device of a fuel evaporation preventive apparatus capable of diagnosing failure of the fuel evaporation preventive apparatus with high accuracy.

Further, it is another object of the present invention to provide a failure diagnosis device of a fuel evaporation preventive apparatus capable of diagnosing failure of the fuel evaporation preventive apparatus with higher accuracy by simple constitution.

Still further, it is another object of the present invention to provide a failure diagnosis device of a fuel evaporation preventive apparatus capable of simply diagnosing failure.

Still further, it is another object of the present invention to provide a failure diagnosis device of a fuel evaporation preventive apparatus with high reliability of diagnosis.

Also, it is another object of the present invention to provide a failure diagnosis device of a fuel evaporation preventive apparatus which operates to avoid destruction of the failure evaporation preventive apparatus.

According to a first aspect of the present invention, there is provided a failure diagnosis device of a fuel evaporation preventive apparatus comprising:

a fuel evaporation preventive apparatus having a canister having an atmospheric hole communicating with outside air and installed in the middle of a purge passage communicating a fuel tank with an intake pipe, for preventing evaporation of fuel by adsorbing at any time fuel gas generated in the fuel tank by an adsorber incorporated in the canister and pertinently introducing the adsorbed fuel gas into the intake pipe by controlling a purge control valve in accordance with a running state of an internal combustion engine;

an initializing means for controlling an inner of the fuel tank to a predetermined initial pressure;

a pressure controlling means for changing the initial pressure to a predetermined target pressure and controlling a purge amount at that time to a constant flow rate by closing the atmospheric hole and driving the purge control valve;

a hermetically enclosing means for constituting a hermetically enclosed section in the fuel evaporation preventive apparatus by closing both the purge control valve and the atmospheric hole when the inner pressure of the fuel tank reaches the target pressure;

a pressure detecting means installed in the hermetically enclosed section; and a failure diagnosing means for diagnosing failure of the fuel evaporation preventive apparatus based on a change of an inner pressure of the hermetically enclosed section.

According to a second aspect of the present invention, there is provided the failure diagnosis device of the fuel evaporation preventive apparatus according to the first aspect, further comprising a pressure detecting means for detecting an inner pressure of the intake pipe and wherein the pressure controlling means calculates a control amount of the purge control valve based on the inner pressure of the intake pipe.

According to a third aspect of the present invention, is provided the failure diagnosis device of the fuel evaporation preventive apparatus according to the first aspect, wherein the failure diagnosing means diagnoses failure by comparing a minimum pressure in the hermetically enclosed section with a predetermined reference value for comparison.

According to a fourth aspect of the present invention, there is provided the failure diagnosis device of the fuel evaporation preventive apparatus according to the first aspect, wherein the failure diagnosing means diagnoses failure by comparing the inner pressure of the hermetically enclosed section with a predetermined reference value for comparison when a predetermined period of time elapses from a time point when the inner pressure of the fuel tank reaches the target pressure.

According to a fifth aspect of the present invention, there is provided the failure diagnosis device of the fuel evaporation preventive apparatus according to the first aspect, wherein the failure diagnosing means diagnoses that the fuel evaporation preventive apparatus is normal when the inner pressure of the hermetically enclosed section is equal to or less than a predetermined protective pressure and opens the atmospheric hole.

DETAILED DESCRIPTION OF PREFERRED EMBODIMENTS

EMBODIMENT 1

Figure 1:
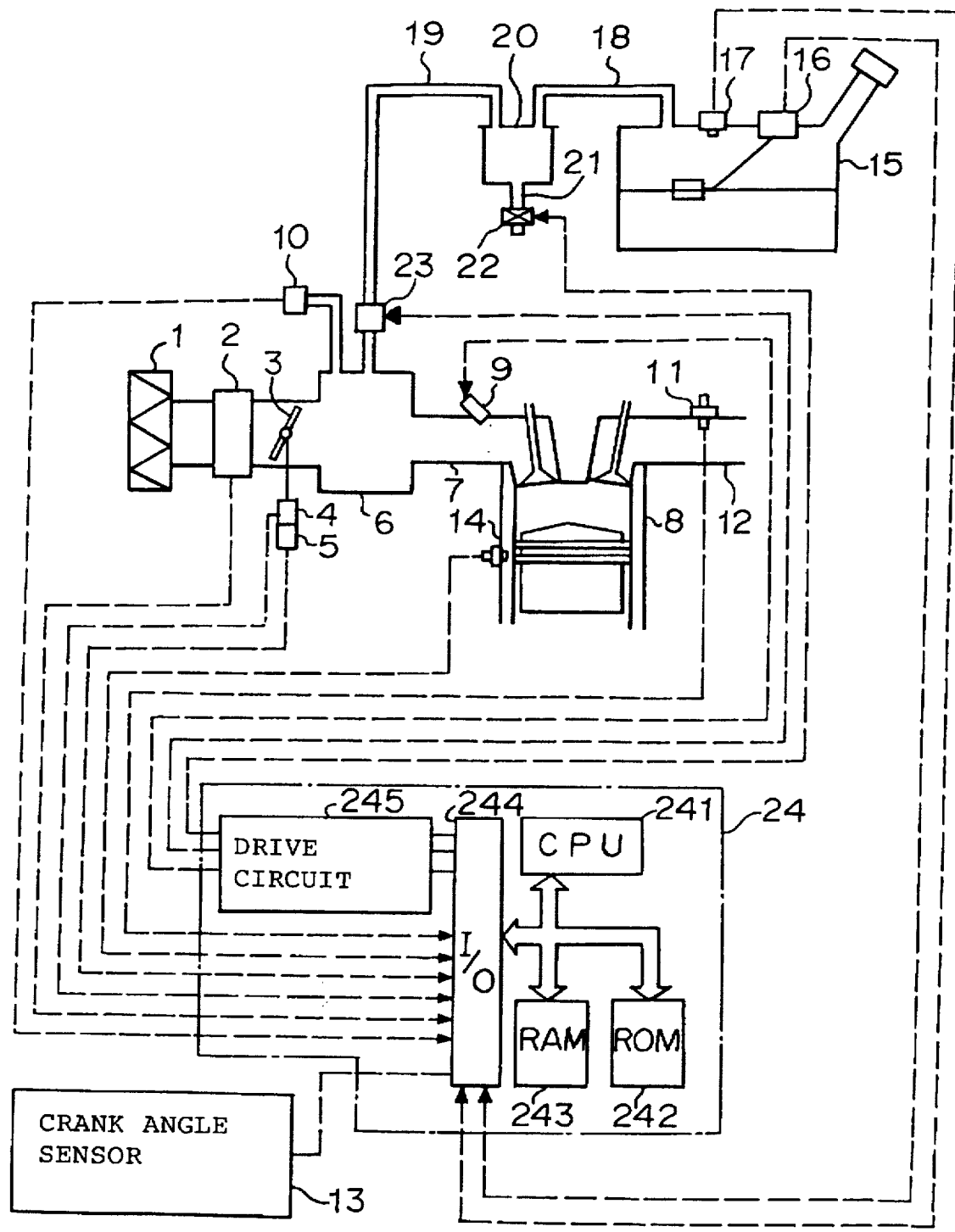
FIG. 1 is a block diagram showing the constitution of Embodiment 1.

FIG. 1 is a block diagram showing the constitution of Embodiment 1. FIG. 1 shows an evaporation purge system as a fuel evaporation preventive apparatus.

In FIG. 1 numeral 1 designates an air cleaner cleaning air, numeral 2 designates an intake amount sensor detecting an amount of air flowing in via the air cleaner 1, numeral 3 designates a throttle valve controlling the amount of air sucked into an engine, numeral 4 designates a throttle sensor detecting an opening degree of the throttle valve 3, numeral 5 designates an idle switch detecting whether the throttle valve 3 is in a fully-closed state, numeral 6 designates a surge tank, numeral 7 designates an intake pipe, numeral 8 designates the engine, numeral 9 designates an injector supplying by injection fuel to the engine 8, numeral 10 designates a boost sensor detecting a pressure in the intake pipe 7 installed to the surge tank 6 downstream from the throttle valve 3, numeral 11 designates an air/fuel ratio sensor detecting an air/fuel ratio in an exhaust pipe 12, numeral 13 designates a crank angle sensor detecting a crank angle and numeral 14 designates a water temperature sensor detecting water temperature of cooling water in the engine 8. Numeral 15 designates a fuel tank storing fuel, numeral 16 designates a fuel level gage detecting a level of fuel, numeral 17 designates a tank inner pressure sensor detecting pressure in the fuel tank 15, numerals 18 and 19 designate a purge passage communicating the tank 15 with the intake pipe 7, numeral 20 designates a canister installed in the middle of the purge passage, in which activated carbon is incorporated as an adsorber, numeral 21 designates an atmospheric hole installed to the canister 20 for communicating to outside air, numeral 22 designates an atmospheric hole opening/closing valve for opening or closing the atmospheric hole 21, numeral 23 designates a purge control valve installed between the canister 20 and the intake pipe 7 for controlling a flow rate in the purge passage and numeral 24 designates an engine control unit which incorporates a failure diagnosis device receiving signals from various sensors in which various controls such as air/fuel ratio control, ignition timing control, exhaust gas recirculation amount control, idling rotational number control and the like other than the purge control, are carried out based on the signals. Also, the engine control unit 24 includes CPU 241 performing calculations, ROM 242 storing various control programs and various maps, RAM 243 temporarily storing detected data, calculated values or the like, a I/O port 244 for inputting and outputting data and a drive circuit 245 driving various portions and CPU 241, ROM 242, RAM 243 and the I/O port 244 are connected by a bus sending and receiving data.

In the above-constituted apparatus, vapor as fuel gas generated at the fuel tank 15 invade the canister 20 via the purge passage 18. Activated carbon, not shown, is incorporated in the canister 20 and the vapor from the fuel tank 15 is adsorbed to the activated carbon.

Meanwhile, the purge control valve 23 is controlled to introduce vapor of a predetermined purge amount into the intake pipe 7 in accordance with a running state of the engine. When the purge control valve 23 is opened, air flows in by a negative pressure in the surge tank 6 via the atmospheric hole 21. The air desorbs the adsorbed vapor when it passes through the activated carbon in the canister 20. The air containing the vapor is introduced into the surge tank and is combusted in the engine 8 along with fuel supplied by the injector 9.

This evaporation purge system is generally well-known and a further detailed explanation will be omitted.

Next, an explanation will be given of the failure diagnosis system of Embodiment 1.

Figure 2:
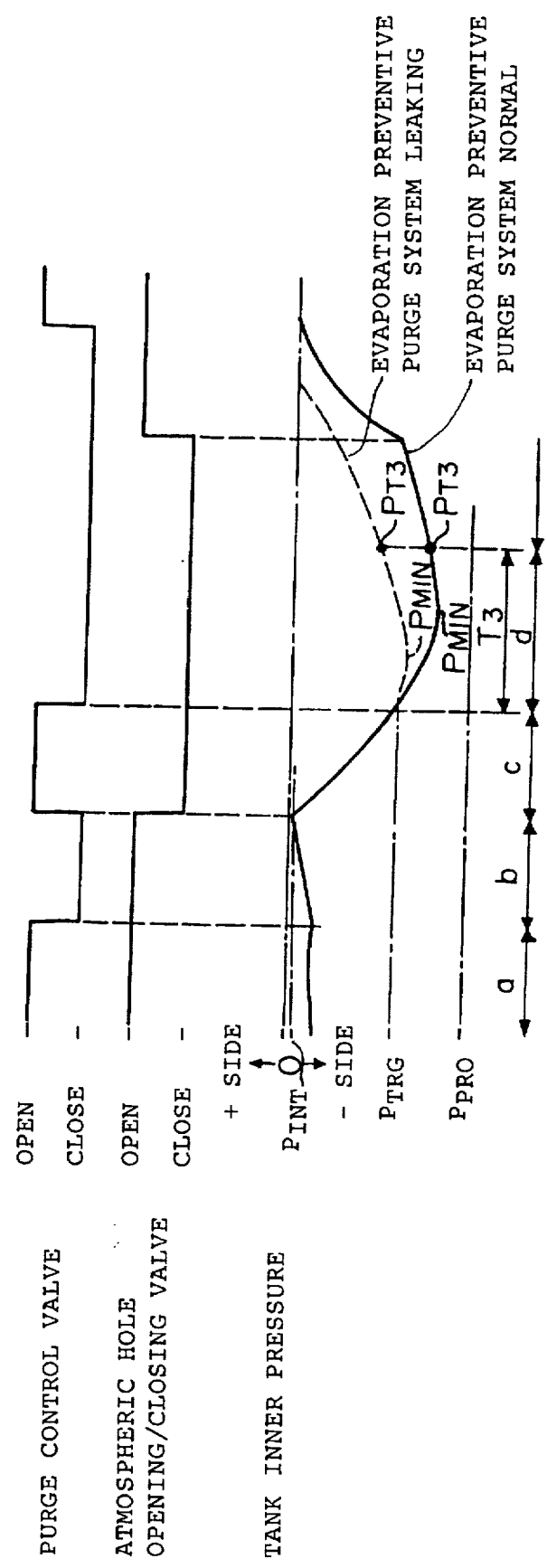
FIG. 2 illustrates time charts showing the operation of Embodiment 1.

FIG. 2 illustrates time charts showing the operation of Embodiment 1.

First, the inner pressure of the fuel tank 15 is controlled to a predetermined initial pressure P INT. The initial pressure P INT is set to a value a little lower than the atmospheric pressure (0 mmHg). Therefore, the purge control valve 23 is closed to exclude negative pressure from the intake pipe 7 and the atmospheric hole 21 is opened by the atmospheric hole opening/closing valve 22, awaiting for the inner pressure of the fuel tank 15 to rise to the initial pressure P INT. An illustrated section "a" designates a state where normal purge control is being performed and a section "b" designates a state where the inner pressure of the fuel tank 15 is being controlled to the initial pressure P INT.

When the inner pressure of the fuel tank 15 reaches the initial pressure P INT, the atmospheric hole 21 installed to the canister 20 is closed and purging is started by driving the purge control valve 23. The purge amount at this time is controlled to be a constant flow rate regardless of the running state of the engine 8. Thereby, the inner pressure of the fuel tank 15 is gradually reduced and soon reaches a predetermined target pressure P TRG. In a designated section "c" a behavior of the inner pressure of the fuel tank 15 reaching the target pressure P TRG is shown. When the inner pressure reaches the target pressure P TRG, the purge control valve 23 is closed by which the fuel tank 15, the purge passage 18 and the canister 20 constitute a hermetically enclosed section.

In section "d" the change of the inner pressure of the fuel tank 15 after reaching the target pressure PTRG is shown by a bold line and a broken line. The bold line indicates the change of the inner pressure in the hermetically enclosed section when the evaporation purge system is normal whereas the broken line indicates the change of the inner pressure in the hermetically enclosed section when a hole having a diameter of 0.5 mm is perforated in the evaporation purge system. The loci of the pressure change provide regularity and it has been experimentally verified that they can be reproduced when the evaporation purge system is operated by the above-mentioned procedure.

Accordingly, when the behavior of the inner pressure in the hermetically enclosed section is monitored after operating the evaporation purge system by the abovementioned procedure, failure of the evaporation purge system can be diagnosed.

In Embodiment 1 attention is paid to the fact that the inner pressure in the hermetically enclosed section in the case where the system is normal becomes lower than that in the case where the system is in failure, a minimum pressure in the hermetically enclosed section is compared with a predetermined reference value for comparison and when the minimum pressure is larger than the reference value for comparison, it is diagnosed that the system is in failure.

As the predetermined reference value for comparison a certain value which is situated between the minimum pressure in the hermetically enclosed section when the system is normal and the minimum pressure in the hermetically enclosed section when the system is in failure is set. Specifically, it is set to a value more proximate to the minimum pressure in the case of failure than a median value of both to restrain an erroneous diagnosis.

Figure 3:
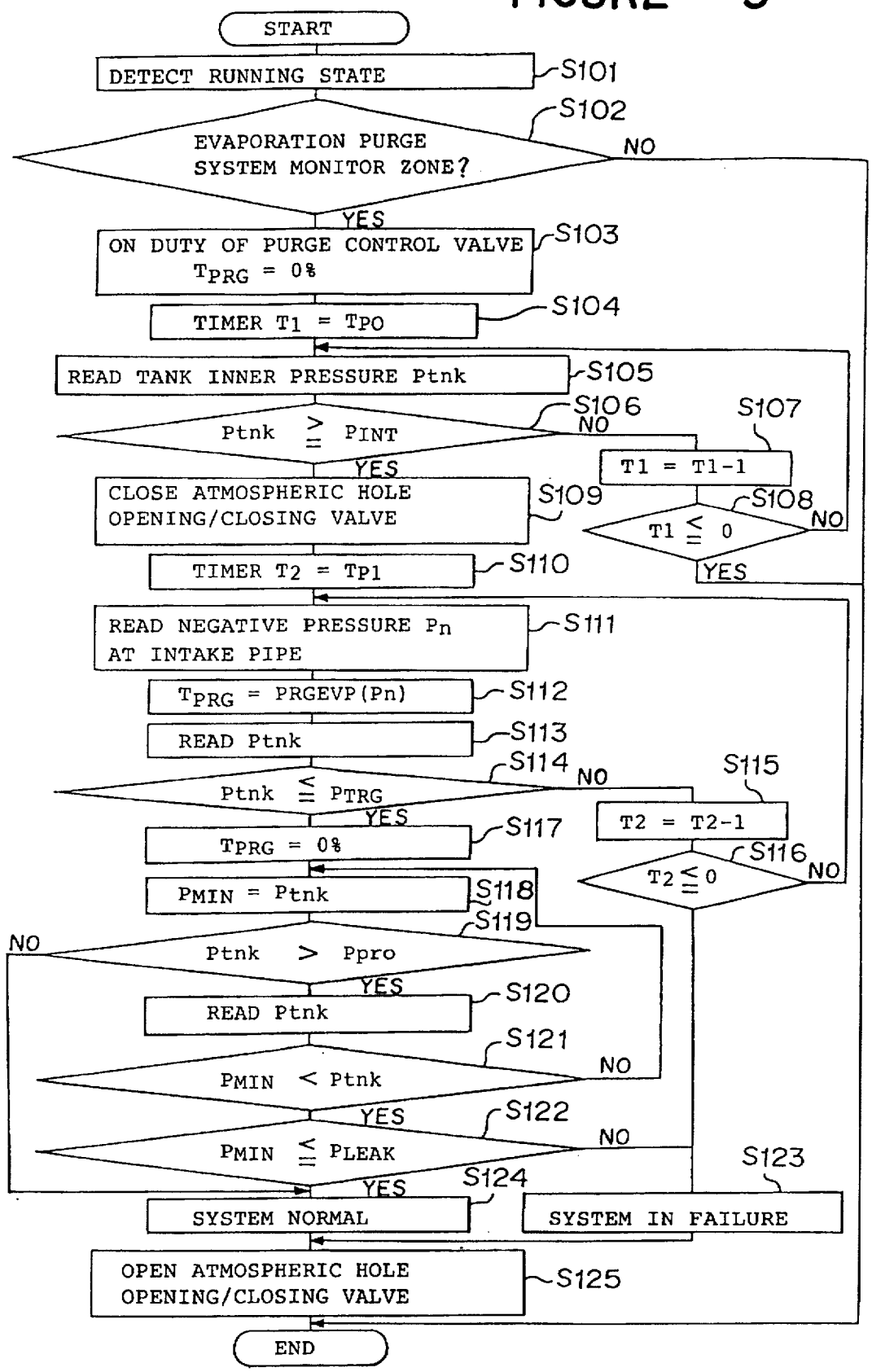
FIG. 3 is a flowchart showing the operation of Embodiment 1.

FIG. 3 is a flowchart showing the operation of Embodiment 1.

In step 101 signals of the intake amount sensor 2, the throttle sensor 4, the crank angle sensor 13, the water temperature sensor 14 etc. are sampled and the running state of the engine 8 is detected based on the signals of the sensors. In step 102 whether the running state detected in step 101 is a running state for diagnosing failure, that is, whether the running state is in an evaporation purge system monitor zone is determined. If it is not in the evaporation purge system monitor zone, the operation finishes the processing without doing anything.

If it is determined that the running state is in the evaporation purge system monitor zone, the operation proceeds to step 103 and closes the purge control valve 23 as shown in FIG. 2. Incidentally, the purge control valve used in Embodiment 1 is opened and closed by a duty signal. Therefore, ON-duty of the purge control valve 23 is set to 0%.

At this time the evaporation purge system is in a state of the section b in FIG. 2.

In next step 104 a timer T1 is set to a predetermined value TP0. In step 105 a tank inner pressure P TNK which is a detected output of the tank inner pressure sensor 17 as the pressure detecting means is read and in step 106 whether the tank inner pressure P TNK becomes larger than an initial pressure P INT is determined. When the tank inner pressure P TNK does not reach the initial pressure P INT, the operation proceeds to step 107 where the timer T1 is decremented by 1. When the value of the timer T1 does not reach 0 in step 108, the operation returns to step 105 and the above-mentioned processing is repeated.

In the case where it is determined that the timer T1 becomes 0 in step 108, it signifies that even if the purge control valve 23 is closed and the atmospheric hole 21 is opened, the tank inner pressure P TNK has not reached the initial pressure P INT in the predetermined period of time determined by the predetermined value TP0.

As mentioned above, it is a condition in diagnosing failure that the tank inner pressure P TNK becomes the initial pressure P INT and the regularity illustrated in FIG. 2 cannot be provided when the tank inner pressure P TNK does not becomes the initial pressure P INT.

Therefore, the processing is finished as it is and the failure diagnosis is not performed to prevent an erroneous diagnosis in this case.

When it is determined that the tank inner pressure P TNK reaches the initial pressure P INT in step 106, the operation proceeds to step 109 where the atmospheric hole 21 is closed by driving the atmospheric hole opening/closing valve 22.

Here, steps 103, 106 and 109 constitute an initializing means for controlling the inner pressure of the fuel tank to the predetermined initial pressure.

When the tank inner pressure P TNK reaches the initial pressure P INT, the operation controls the tank inner pressure P TNK to a target pressure P TRG while controlling constant the purge amount. This behavior is illustrated by the section c in FIG. 2.

Figures 4, 5:
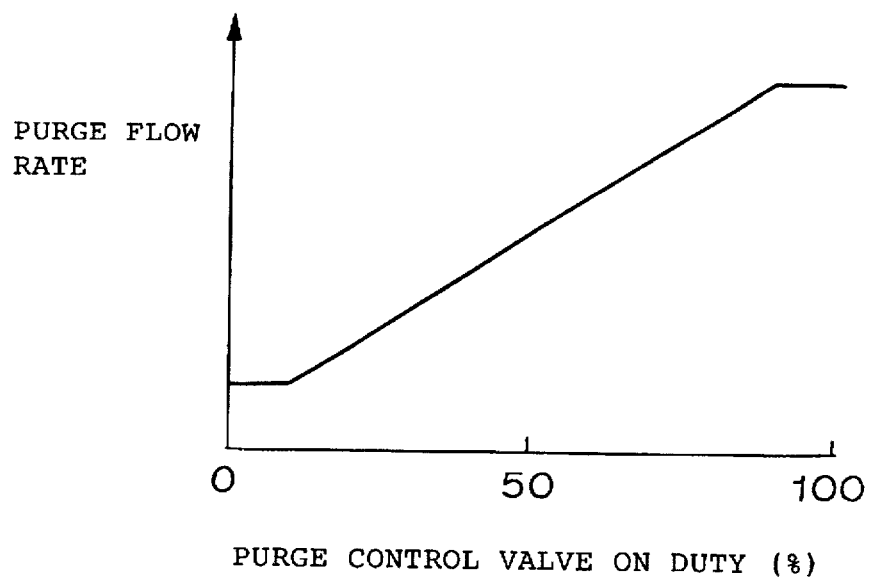
FIG. 4 is an explanatory view showing store content of a monitoring period ON-duty table.
FIG. 5 is a characteristic diagram showing a relationship between ON-duty and a purge flow rate.

In step 110 a timer T2 is set to a predetermined value TP1. In next step 111 a negative pressure PN at the intake pipe is read by the boost sensor 10. In step 112 ON-duty of the purge control valve 23 is determined in accordance with a value of the negative pressure PN at the intake pipe. The ON-duty is provided in reference to a monitoring time ON-duty table as shown by FIG. 4. The smaller the numerical value of the negative pressure at the intake pipe, that is, the smaller the power of sucking the purge gas to the intake pipe the larger the ON-duty and the larger the numerical value, that is, the larger the power of sucking the purge gas to the intake pipe the smaller the ON-duty is set.

A relationship between the ON-duty of the control valve 23 and the purge amount is shown in a characteristic diagram of FIG. 5 where the larger the ON-duty the more increased is the purge amount.

Therefore, the purge amount can be controlled constant regardless of the running state of the engine 8 when the ON-duty of the purge control valve is determined in accordance with the table of FIG. 4.

The purge amount relates to a rate for the tank inner pressure P TNK to reach the target pressure P TRG. When the purge amount is decreased and a change rate of the pressure is reduced, no considerable overshooting takes place in the section d of FIG. 2 and a difference of the changes of pressures in the normal time and in the failure time becomes difficult to distinguish. When the purge amount is increased and the change rate of pressure is enlarged, the overshooting becomes considerable, the inner pressure of the hermetically enclosed section becomes a large negative pressure which may dent the fuel tank 15.

Therefore, a pertinent quantity of the purge amount is set such that the above-mentioned problem is not caused in Embodiment 1. Specifically, as shown in FIG. 2, the change of pressure is so set as it is accompanied by a more or less overshooting.

In step 113 the signal of the tank inner pressure sensor 17 is read and the tank inner pressure P TNK is detected. In step 114 whether the tank inner pressure P TNK reaches the target pressure P TRG is determined. In the case where it is determined that the tank inner pressure does not reach the target pressure in step 114, the timer T2 is decremented by 1 in step 115. Further, whether the timer T2 becomes 0 is determined in step 116 and if it is not 0, the operation returns to step 111 and repeats the above-mentioned processing.

Now, in the case where it is determined that the timer T2 is 0, it is the case where even if air has been drawn by a constant purge amount, the tank inner pressure PTNK could not be controlled to the target pressure P TRG in a predetermined time determined by PT2. In this case it is determined that a hole is perforated in the evaporation purge system and therefore, the tank inner pressure P TNK could not be lowered and it is diagnosed that the system is in failure in step 123, explained later.

Further, in the case where it is determined that the tank inner pressure P TNK reaches the target pressure P TRG in step 114, the purge control valve 23 is closed in step 117 to thereby constitute a hermetically enclosed section.

Here, steps 109, 111, 112, 113 and 114 constitute a pressure controlling means. Also, steps 109 and 117 constitute a hermetically enclosing means.

Next steps are a processing of detecting a minimum pressure of the inner pressure in the hermetically enclosed section and diagnosing failure by comparing the minimum pressure with a predetermined reference value for comparison P LEAK.

In step 118 the tank inner pressure P TNK detected by the tank inner pressure sensor 17 is stored as the minimum pressure P MIN. In this case P TRG detected in step 113 is stored as the minimum pressure P MIN.

In next step 119 the tank inner pressure P TNK is compared with a predetermined protective pressure P PRO. The protective pressure P PRO is set to a value which can not be reached in system failure and a value whereby dent or destruction of the fuel tank 15 is not caused.

Figure 6:
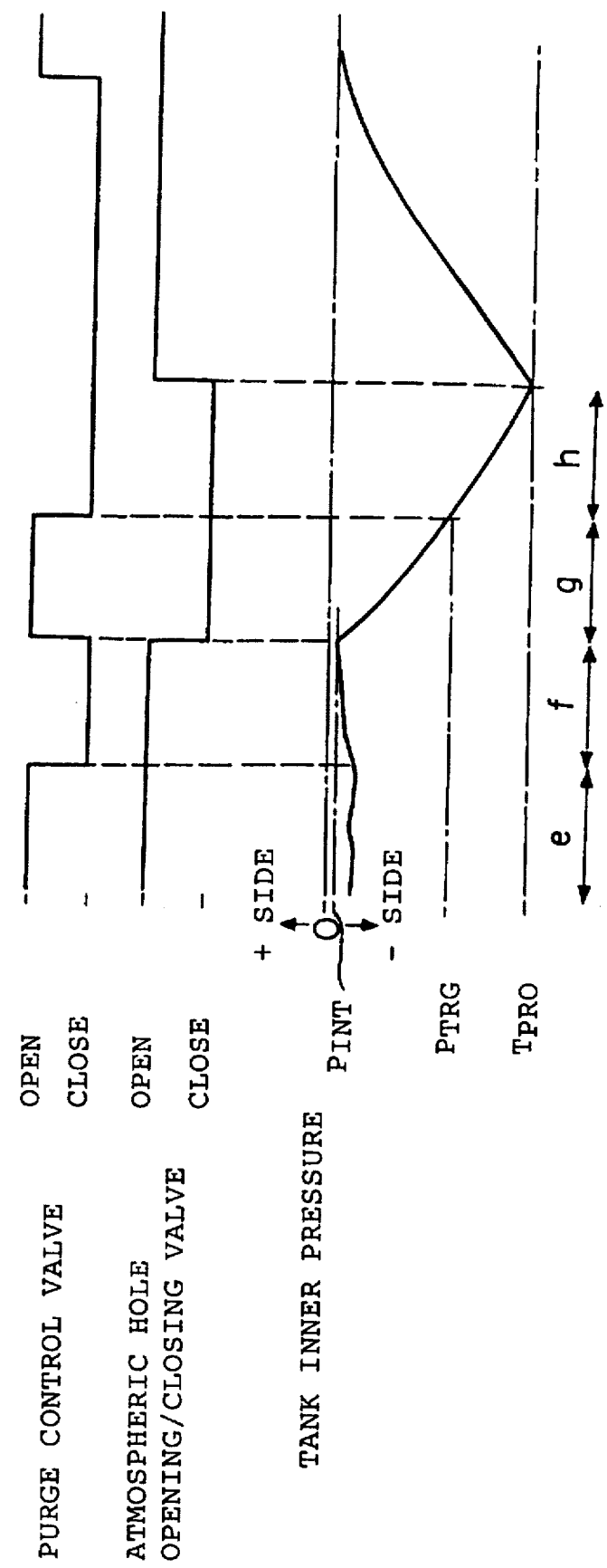
FIG. 6 illustrates time charts showing a case where an inner pressure of a tank becomes excessively negative.

FIG. 6 indicates a case where the tank inner pressure P TNK becomes excessively negative in monitoring the evaporation purge system. In FIG. 6, sections e, f and g respectively correspond to the sections a, b and c in FIG. 2. A section h shows a state where the tank inner pressure P TNK becomes excessively negative. In the case where the tank inner pressure P TNK becomes the protective pressure P PRO or less, it is determined that the system is normal in step 124, explained later and the atmospheric hole 21 is opened in step 125 to avoid damage of the evaporation purge system and the tank inner pressure is made rise as shown in FIG. 6.

When the tank inner pressure P TNK is larger than the protective pressure P PRO, the operation proceeds to step 120 where the signal of the tank inner pressure sensor 17 is read. When the tank inner pressure P TNK at this time is smaller than the minimum pressure P MIN stored in step 118, the operation returns to step 118 and updates the value of the minimum pressure P MIN.

By repeating the processing thereafter the minimum pressure P MIN is updated and the minimum pressure P MIN as shown in FIG. 2 is provided.

When the minimum pressure P MIN is obtained, the operation proceeds to step 122 where the minimum pressure is compared with the reference value for comparison P LEAK. When the minimum pressure P MIN is the reference value for comparison P LEAK or larger, it is determined that the tank inner pressure has followed the locus of the broken line shown in FIG. 2 and it is determined that the system is in failure in step 123. On the other hand, when the minimum pressure P MIN is smaller than the value for comparison P LEAK, it is determined that the tank inner pressure has followed the locus of the bold line shown in FIG. 2 and it is determined that the system is normal in step 124.

After the diagnosis of the system has been performed in step 123 or step 124, the atmospheric hole 21 is opened by driving the atmospheric hole opening/closing valve 22 in step 125 and the monitor processing is finished.

Here, steps 122, 123 and 124 constitute a failure diagnosing means.

As stated above, according to Embodiment 1 failure analysis of evaporation purge system can be conducted based on the change of the inner pressure in the hermetically enclosed section.

Further, an experiment is conducted for comparing among a case where a hole having a diameter of 0.5 mm is perforated in the evaporation purge system, a case where a hole having a diameter of 1.0 mm is perforated and a case where the system is normal in Embodiment 1, and a case where a hole having a diameter of 0.5 mm is perforated, a case where a hole having a diameter of 1.0 mm is perforated and a case where the system is normal in a method equivalent to that in the conventional example.

As a result, a difference between a deviation ($\Delta$P2–$\Delta$P1) in the case where a hole having the diameter of 1.0 mm is perforated and the deviation in the case where the system is normal in the conventional example, is substantially the same as a difference between P MIN in the case where a hole having the diameter of 0.5 mm is perforated and P MIN in the case where the system is normal in Embodiment 1.

In other words, it demonstrates that according to Embodiment 1, even in the case where a hole having the diameter of 0.5 mm is perforated, failure diagnosis can be conducted with accuracy equivalent to that in the case where a hole having the diameter of 1.0 mm is perforated in the conventional example.

Furthermore, there is a potentiality in the present invention in which even in the case where a hole having a smaller diameter is perforated, failure diagnosis can be performed by detecting the hole.

Accordingly, in the device of Embodiment 1 more accurate failure diagnosis can be performed than in the conventional device.

Also, in Embodiment 1 the negative pressure PN at the intake pipe is detected by using the boost sensor 10 and ON-duty of the purge control valve 23 is determined based on the negative pressure PN of the intake pipe and accordingly, the control can be performed with simple construction and with higher accuracy.

For example, ON-duty of the purge control valve 23 may also be determined without directly detecting the negative pressure PN of the intake pipe but by using a predicted value of the negative pressure of the intake pipe provided by prediction. However, in this case the predicted value of the negative pressure of the intake pipe must be obtained by providing a rotational number and a charge efficiency from various sensors and from a map with these two factors as parameters. Also, the negative pressure of the intake pipe differs by whether the vehicle is at highland or at lowland and therefore, at least two sheets of the maps must be prepared and an interpolation calculation must be conducted depending on the altitude where the vehicle is present.

Therefore, the construction is more simple in the case where the negative pressure of the intake pipe is directly obtained by sensors as in Embodiment 1 and further, the detected value is more reliable.

The failure analysis by Embodiment 1 is simplified since the failure analysis is conducted by comparing the minimum pressure P MIN in the hermetically enclosed section with the reference value for comparison P LEAK.

Additionally, in Embodiment 1, when the inner pressure at the hermetically enclosed section is equal to or lower than the protective pressure P PRO, the atmospheric hole 21 is swiftly opened and the inner pressure of the tank is elevated and therefore, the evaporation purge system is not destructed during the monitoring.

EMBODIMENT 2

Embodiment 2 provides a failure diagnosis device of a fuel evaporation preventive apparatus having high reliability of diagnosis.

In Embodiment 1 failure diagnosis is performed by comparing the minimum pressure P MIN with the reference value for comparison P LEAK shown by FIG. 2. However, analyzing of FIG. 2 reveals that difference of pressures in the normal time and in the failure time at a time point elapsed by a predetermined period of time of T3 since the tank inner pressure P TNK has reached the target pressure P TRG, is larger than the difference between the minimum pressures in the normal tank and in the failure tank.

Therefore, the possibility of erroneous diagnoses is lowered by comparing the tank inner pressure P TNK with the reference value for comparison P LEAK after the elapse of the predetermined time period of T3 and the reliability of diagnosis is promoted.

Incidentally, in Embodiment 2 the reference value for comparison P LEAK is set to a median value between the pressures in the normal time and in the failure time at the time point after the elapse of the predetermined period of time of T3 since the tank inner pressure P TNK has reached the target pressure P TRG, or a predetermined value more proximate to the pressure in the failure time than the median value.

Figure 7:
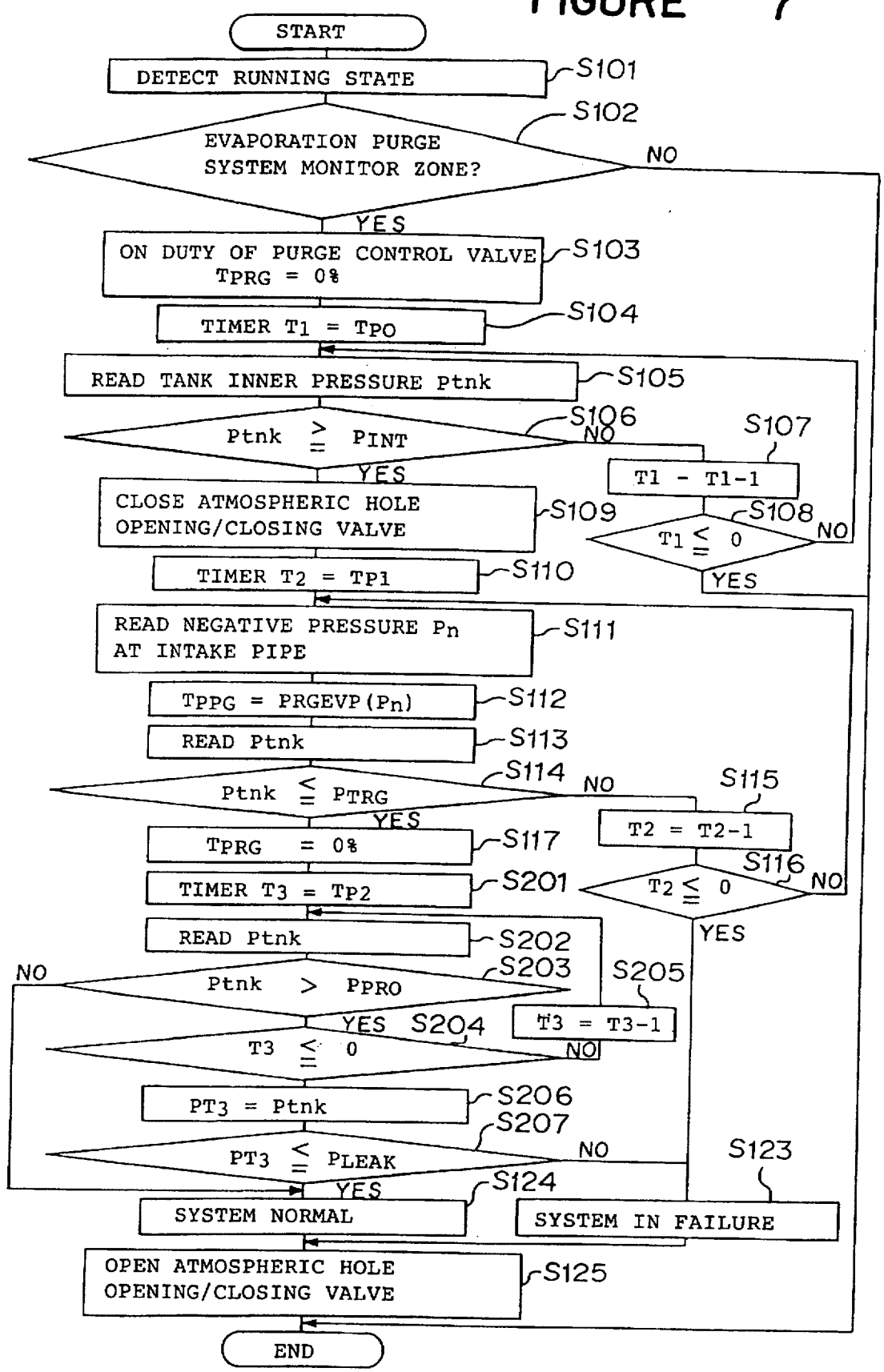
FIG. 7 is a flowchart showing the operation of Embodiment 2

FIG. 7 is a flowchart showing the operation of Embodiment 2. In FIG. 7 portions the same as or corresponding to those in Embodiment 1 are attached with the same notations.

The basic operation of Embodiment 2 is the same as that in Embodiment 1 and the explanation will be omitted and an explanation will be given of the operation of characteristic portions.

In step 114, when In step 114, when the tank inner pressure P TNK reaches the target pressure P TRG, the purge control valve 23 is closed in step 117 and the operation proceeds to step 201.

In step 201 a predetermined value TP2 is set to a timer T3. The predetermined value TP2 corresponds to the predetermined period of time T3 in FIG. 2.

In next step 202 the tank inner pressure P TNK is read and in step 203 whether the tank inner pressure P TNK is equal to or less than the protective pressure P PRO is determined. The operation of the steps 202 and 203 are the same as those in Embodiment 1.

When it is determined in step 203 that the tank inner pressure P TNK is larger than the protective pressure P PRO, the operation proceeds to step 204 and whether the timer T3 is 0, or whether the predetermined period of time T3 has elapsed is determined. When the predetermined period of time T3 has not elapsed, the operation proceeds to step 205 where the timer T3 is decremented by 1 and the operation returns to step 202 whereby the above processing is repeated.

When it is determined in step 204 that the predetermined period of time T3 has elapsed, the operation proceeds to step 206 where the tank inner pressure P TNK is stored as PT3 and PT3 is compared with the reference value for comparison P LEAK in step 207. If the reference value for comparison P LEAK is larger than the tank inner pressure P TNK, the operation diagnoses that the system is normal and if the reference value for comparison P LEAK is smaller than that, the operation diagnoses that the system is in failure.

Therefore, the reliability of the failure diagnosis can be promoted since the failure diagnosis is conducted at a time point where the difference of pressures in the normal time of system and in the failure time thereof is larger according to Embodiment 2.

As mentioned above, according to the present invention, the regularity is provided to the behavior of the inner pressure in the hermetically enclosed section and therefore, failure of the fuel evaporation preventive apparatus can be diagnosed with accuracy based on the change in the inner pressure in the hermetically close section.

Also, according to the present invention the pressure detecting means for detecting the inner pressure of the intake pipe is installed and the control amount of the purge control valve is calculated based on the pressure of the intake pipe that is detected by the pressure detecting means and therefore, the structure can be simplified.

Also, the present invention failure diagnosis is conducted by comparing the minimum pressure in the hermetically enclosed section with the reference value for comparison and therefore, the failure analysis can be performed with simplicity.

Further, according to the present invention the failure analysis is conducted by comparing the inner pressure in the hermetically enclosed section with the reference value for comparison when the predetermined period of time has elapsed since the time point where the inner pressure of the fuel tank has reached the target pressure and therefore, the reliability of the failure analysis can be promoted.

Additionally, according to the present invention the atmospheric hole is opened when the inner pressure of the fuel tank is equal to or less than the protective pressure and therefore, destruction of the fuel evaporation preventive apparatus can be avoided.

What is claimed is:

1. A failure diagnosis device of the fuel evaporation preventive apparatus, comprising:

a fuel evaporation prevention apparatus having a canister having an atmospheric hole communicating with outside air and installed in a purge passage connecting a fuel tank with an intake pipe, for preventing evaporation of fuel by adsorbing fuel gas generated in the fuel tank by an adsorber incorporated in the canister and pertinently introducing the adsorbed fuel gas into the intake pipe by controlling a purge control valve in accordance with a running state of an internal combustion engine;

initializing means for controlling an inner pressure of the fuel tank to a predetermined initial pressure;

pressure controlling means for changing the initial pressure to a predetermined target pressure and controlling a purge amount at that time to a constant flow rate by closing the atmospheric hole and driving the purge control valve;

hermetically enclosing means for forming a hermetically enclosed section in the fuel evaporation preventive apparatus by closing both the purge control valve and the atmospheric hole when the inner pressure of the fuel tank reaches the target pressure;

pressure detecting means installed in the hermetically enclosed section for detecting a minimum pressure occurring in the hermetically enclosed section after the purge control valve and the atmospheric hole are closed; and failure diagnosing means for diagnosing failure of the fuel evaporation preventive apparatus by comparing the minimum pressure in the hermetically enclosed section with a predetermined reference value.

2. The failure diagnosis device of the fuel evaporation preventive apparatus according to claim 1, further comprising an intake pipe pressure detecting means for detecting an inner pressure of the intake pipe and wherein the pressure controlling means calculates a control amount of the purge control valve based on the inner pressure of the intake pipe.

3. The failure diagnosis device of the fuel evaporation preventive apparatus according to claim 1, wherein the failure diagnosing means diagnoses that the fuel evaporation preventive apparatus is normal when the inner pressure of the hermetically enclosed section is equal to or less than a predetermined protective pressure and opens the atmospheric hole.

4. The failure diagnosis device of the fuel evaporation preventive apparatus according to claim 1, wherein the constant flow rate is set such that the inner pressure in the hermetically enclosed section overshoots the target pressure during a period of pressure overshoot occurring after the purge control valve and atmospheric hole are closed, and wherein the minimum pressure is detected during the period of pressure overshoot.

5. The failure diagnosis device of the fuel evaporation preventive apparatus according to claim 4, wherein the failure diagnosing means diagnoses that the fuel evaporation preventive apparatus is normal when the inner pressure of the hermetically enclosed section is equal to or less than a predetermined protective pressure, the failure diagnosing means comparing the inner pressure of the hermetically enclosed section to the predetermined protective pressure during the period of pressure overshoot.

6. The failure diagnosis device of the fuel evaporation preventive apparatus according to claim 2, wherein the constant flow rate is maintained by adjusting the control amount of the purge control valve as a function of the inner pressure of the intake pipe.

7. A failure diagnosis device of the fuel evaporation preventive apparatus, comprising:

a fuel evaporation prevention apparatus having a canister having an atmospheric hole communicating with outside air and installed in a purge passage connecting a fuel tank with an intake pipe, for preventing evaporation of fuel by adsorbing fuel gas generated in the fuel tank by an adsorber incorporated in the canister and pertinently introducing the adsorbed fuel gas into the intake pipe by controlling a purge control valve in accordance with a running state of an internal combustion engine;

initializing means for controlling an inner pressure of the fuel tank to a predetermined initial pressure;

pressure controlling means for changing the initial pressure to a predetermined target pressure and controlling a purge amount at that time to a constant flow rate by closing the atmospheric hole and driving the purge control valve;

hermetically enclosing means for forming a hermetically enclosed section in the fuel evaporation preventive apparatus by closing both the purge control valve and the atmospheric hole when the inner pressure of the fuel tank reaches the target pressure, wherein the constant flow rate is set such that the inner pressure in the hermetically enclosed section overshoots the target pressure during a period of pressure overshoot occurring after the purge control valve and atmospheric hole are closed;

pressure detecting means installed in the hermetically enclosed section for detecting the inner pressure of the hermetically enclosed section; and failure diagnosing means for diagnosing failure of the fuel evaporation preventive apparatus, wherein the failure diagnosing means diagnoses failure by comparing the inner pressure of the hermetically enclosed section with a predetermined reference value at a point in time during the period of pressure overshoot.

8. The failure diagnosis device of the fuel evaporation preventive apparatus according to claim 7, further comprising an intake pipe pressure detecting means for detecting an inner pressure of the intake pipe and wherein the pressure controlling means calculates a control amount of the purge control valve based on the inner pressure of the intake pipe.

9. The failure diagnosis device of the fuel evaporation preventive apparatus according to claim 8, wherein the constant flow rate is maintained by adjusting the control amount of the purge control valve as a function of the inner pressure of the intake pipe.

10. The failure diagnosis device of the fuel evaporation preventive apparatus according to claim 7, wherein the failure diagnosing means diagnoses that the fuel evaporation preventive apparatus is normal when the inner pressure of the hermetically enclosed section is equal to or less than a predetermined protective pressure and opens the atmospheric hole.

11. The failure diagnosis device of the fuel evaporation preventive apparatus according to claim 10, wherein the failure diagnosing means compares the inner pressure of the hermetically enclosed section to the predetermined protective pressure during the period of pressure overshoot.

* * * * *